United States Patent [19]

Zweegers

[11] Patent Number: 4,574,569
[45] Date of Patent: Mar. 11, 1986

[54] RAKING APPARATUS

[75] Inventor: Robertus A. J. J. Zweegers, Geldrop, Netherlands

[73] Assignee: Verenigde Bedrijven van Thiel (Van Thiel United) B.V., Netherlands

[21] Appl. No.: 681,823

[22] Filed: Dec. 14, 1984

[30] Foreign Application Priority Data

Dec. 15, 1983 [NL] Netherlands ............... 8304325

[51] Int. Cl.⁴ ............................................. A01D 78/04
[52] U.S. Cl. ........................................ 56/376; 56/377
[58] Field of Search .......... 56/377, 376, 366, DIG. 21

[56] References Cited

U.S. PATENT DOCUMENTS

| 2,605,599 | 8/1952 | Curry | 56/376 |
| 2,699,639 | 1/1935 | Lambert et al. | 56/376 |
| 2,735,256 | 2/1956 | West | 56/376 |
| 2,922,271 | 1/1960 | Van Der Lely et al. | 56/377 |
| 3,093,954 | 6/1963 | Johnston | 56/377 |
| 3,587,217 | 6/1971 | Harriott | 56/376 |
| 3,728,850 | 4/1973 | Flory | 56/377 |

Primary Examiner—Robert Peshock
Assistant Examiner—John G. Weiss
Attorney, Agent, or Firm—Burns, Doane, Swecker & Mathis

[57] ABSTRACT

An apparatus for displacing material lying on the ground transversely to the direction of travel, in particular a raking apparatus for mown crops, such as hay, comprising at least two endless draw members operative in upright planes oriented transversely to the direction of travel. The draw members being arranged in tandem and mutually laterally offset relationship relatively to the direction of travel. The draw members are interconnected by linkages, each consisting of an intermediate bar extending at least partly in an oblique direction relative to the direction of travel. At least one part of each linkage is designed as a carrier of downwardly directed rake tines. The draw members are designed in such a manner that the rake tines perform a translation motion at least over the greater part of their path of movement.

9 Claims, 1 Drawing Figure

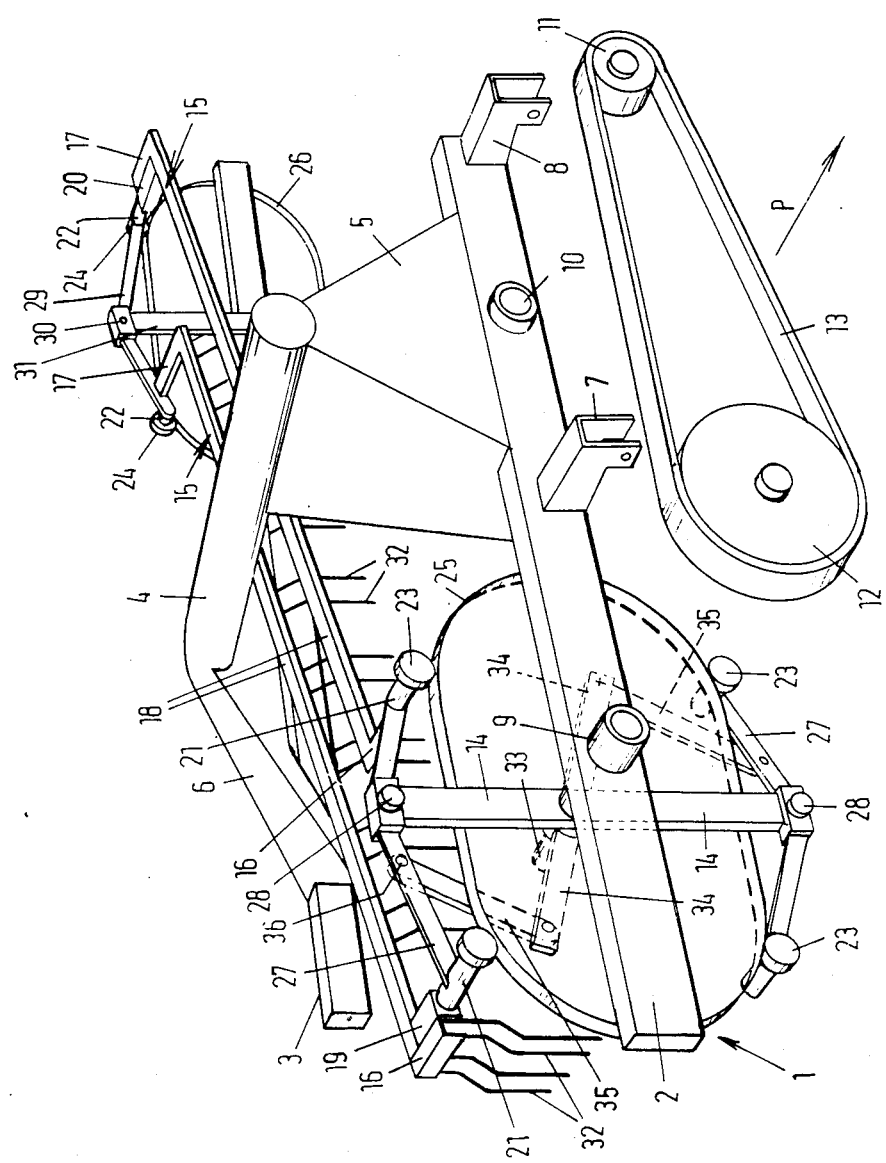

RAKING APPARATUS

BACKGROUND AND SUMMARY OF THE PRESENT INVENTION

The invention relates to an apparatus for displacing material lying on the ground transversely to the direction of travel, in particular a raking apparatus for mown crops, comprising at least two endless draw members operative in upright planes oriented transversely to the direction of travel, said draw members being arranged in tandem and mutually laterally offset relationship relatively to the direction of travel, and being interconnected by linkages, each consisting of an intermediate bar extending at least partly in an oblique direction relative to the direction of travel, at least one part of each linkage being designed as a carrier of downwardly directed rake tines.

Such an apparatus for raking hay is described in Dutch patent application No. 69.01862, laid open to public inspection on Aug. 10, 1970, and is designed in such a manner that the rake tines perform a substantially circular motion, said tines contacting the ground only shortly. Consequently, when the speed is increased for obtaining a larger capacity, the material will be strongly damaged due to the higher rake tine speed, resulting in the dreaded loss of leaf.

It is an object of the present invention to eliminate this drawback. To this end, a raking apparatus of the above described type is characterized in that the draw members are designed in such a manner that the rake tines perform a translation movement along the ground at least over a part of their path of movement. The rake efficiency can be further increased when each intermediate bar is provided on at least one end with an end bar oriented parallel to the direction of travel, right-angled to the working surfaces of the draw members and connected rotatably to the draw members, and both said end bar(s) and the intermediate bar is provided with downwardly directed rake tines. Moreover, a straight sweep-away or pick-up edge is obtained thereby.

For obtaining the above translation motion, the draw members may be fitted with tracks extending at least partly straightly.

The free end bars of each linkage oriented parallel to the direction of travel may be fitted with rollers adapted for coaction with a curve disc or track fitted with said straight track or a part thereof.

These ends may be interconnected two by two.

In a further embodiment of the present invention, when the raking apparatus comprises four linkages, the linkages may be interconnected two by two, and both resulting linkages may be interconnectec by means of a connecting rod whose centre is connected to a frame-mounted drivable swivel bar. In spite of a certain unbalance, a quiet course of the raking apparatus is thereby obtained during the execution of the contemplated motion pattern.

The latter is enchanced yet when the linkages are interconnected two by two by a bar rotatably connected to the swivel bar, said first mentioned bar being driven by an intermediate arm whose other end is rotatably connected to a lever affixed to the shaft. Such a construction ensures a still quieter course, without substantial accelerations and decelerations, than in case the swivel bar should be driven directly by the shaft.

BRIEF DESCRIPTION OF THE DRAWING

One embodiment of the raking apparatus according to the invention will now be described, by way of example, with reference to the accompanying perspective drawing.

DETAILED DESCRIPTION OF THE PREFERRED EMBODIMENTS

According to the drawing, a raking apparatus, generally indicated at 1, comprises two frame girders 2, 3. The frame girders 2, 3 are interconnected by a bridge consisting of a tube 4 positioned perpendicular to the girders, said tube being connected to the two frame girders through the plates 5,6.

The front frame girder 2 (the direction of motion of the apparatus is indicated with an arrow P) is fitted with a pair of carriers 7, 8 for connection to a tractor. The front frame girder also contains two hubs 9, 10 for receiving shafts. The shaft, not shown, received by the hub 10 is destined for receiving a pulley 11 and is further coupled to the power take-off shaft of the tractor, not shown.

The driven shaft 33 extending through the other hub 9 is adapted to receive a wheel 12 and, at the other side of the frame girder 2, a freely rotatable swivel bar 14 and a lever 34 affixed to the shaft 33. The lever 34 is rotatably connected through an intermediate arm 35 to a bar 27, viz. in a point 36 situated beside the centre 28. The rotation of the lever 34 is achieved in that the wheel 12 is connected through a rope sheave 13 to the pulley 11, while the swivel bar 14 is mounted for free rotation on the shaft 33.

The raking means proper comprise in the embodiment shown four linkages 15 (only two being shown for the sake of clarity). Each linkage comprises end bar portions 16, 17 interconnected by an intermediate bar 18. Bearing blocks 19, 20 are fixedly connected to the end bar portions 16, 17, said bearing blocks receiving shafts, not further shown, on each of which there is mounted a hub 21, 22. Furthermore, the end of each shaft is fitted with a roller 23, 24. The rollers 23 abut against the periphery of a curve disc or the like device 25, which is affixed to the front frame girder 2. The swivel bar 14, the lever 34, the intermediate arm 35, the bar 27 and the curve disc 25 together generally form a draw member. Similarly, the rollers 24 abut against a curve disc 26 mounted on the rear frame girder 3.

As further shown in the drawing, the hubs 21 adjacent the front frame girder 2 are interconnected two by two by means of the said bar 27, the centre 28 of which is rotatably connected to a swivel bar 31 connected to the rear frame girder 3.

The portions corresponding with the lever 34 and the intermediate arm 35 have been omitted here for the sake of clarity.

The above end bar portions 16, 17, as well as the intermediate bar 18 connecting these portions are provided with rake tines 32 arranged pairwise.

When the raking machine is operative, the swivel bar 14 is rotated, so that the roller 23 will follow the circumferential path of the curve disc 25, forcing the rollers 24 to follow the circumference of the curve disc 26. As a result of the construction chosen, all rake tines 32 will traverse a path substantially consisting of a translation motion, by means of which the material to be rake is moved along a given distance laterally relative to the direction of movement of the machine. By the movement of the machine in the above mentioned direction, the material is moved further laterally by successive tines, i.e. the material to be raked is displaced laterally along the entire width of the raking machine.

It is observed that in the embodiment shown, only the swivel bar 14 connected to the front frame girder 2 is driven. The swivel bar 31 connected to the rear frame girder 3 will automatically follow the movement of the front swivel bar 14 as a result of the interconnection through linkages of two rollers 23, 24. It is also possible to provide a driven arrangement of the swivel bar 31.

It will be clear that a great many modifications are possible within the scope of the present invention. For instance, the frame girder 3 may be provided with one or more auxiliary support wheels. Naturally, the raking machine may have a dual design, with hinged portions.

It is further noted that the aforedescribed rake principle, in which the path of movement of the tines is at least partially a straight path, can also be applied to a so-called hay tedder. In such machines, as used in the path, the tines are secured to the circumference of rotating discs disposed at an acute angle to the ground, so that, in the machines of the prior art, the tines touch the ground essentially at one point only.

By the combination of on the one end of the translation motion and on the other end the end bar portions carrying the rake tines, it is possible to obtain at a low speed a large capacity without damaging the crops.

What I claim:

1. An apparatus for displacing material lying on the ground transversely to the direction of travel, in particular a raking apparatus for mown crops, such as hay, comprising at least two endless draw members operative in upright planes with working surfaces oriented transversely to the direction of travel, said draw members being arranged in tandem and mutually laterally offset relationship relative to the direction of travel and being interconnected by linkages, each linkage including an intermediate bar extending at least partially in an oblique direction relative to the direction of travel each intermediate bar being provided an end bar on each end oriented parallel to the direction of travel and at a right angle to the working surfaces of the draw members, said intermediate bars being connected rotatably to the draw members, both said end bars and the intermediate bars being provided with downwardly directed rake tines, the draw members being arranged such that the rake tines perform a translation motion at least over the greater part of their path of movement.

2. An apparatus according to claim 1, wherein the draw members include tracks extending at least partially straight.

3. An apparatus according to claim 2, wherein the ends bars are provided with free ends on each linkage oriented parallel to the direction of travel including rollers adapted for coaction with a curve disc carrying said partially straight track.

4. An apparatus according to claim 3, wherein said ends are interconnected.

5. Apparatus according to claim 1, comprising the draw members to have at least four linkages, the linkages being interconnected so as to define two resulting linkages which are interconnected by a connecting rod, the centre of the connecting rod being connected to a frame-mounted swivel bar which is drivable by a tractor.

6. An apparatus according to claim 5, wherein said swivel bar being driven by an intermediate arm whose other end is connected rotatably to a lever fixedly connected to a shaft drivable by the tractor.

7. An apparatus according to claim 1, wherein the draw members include tracks extending at least partially straight.

8. An apparatus according to claim 7, wherein the the end bars are provided with free ends on each linkage oriented parallel to the direction of travel include rollers adapted for coaction with a curve disc carrying said partially straight track.

9. An apparatus according to claim 8, wherein said ends are interconnected.

* * * * *